United States Patent [19]

Hen

[11] 4,065,423

[45] Dec. 27, 1977

[54] PAPER COATING LATEX COMPOSITIONS CONTAINING COPOLYMERS OF MONOVINYLIDENE AROMATIC MONOMER, ALIPHATIC CONJUGATED DIENE AND AN ARYLOYLOXYCARBOXYLIC ACID MONOMER

[75] Inventor: John Hen, Cheshire, Conn.

[73] Assignee: Uniroyal, Inc., New York, N.Y.

[21] Appl. No.: 682,811

[22] Filed: May 3, 1976

[51] Int. Cl.$^2$ .............................................. C08L 9/00
[52] U.S. Cl. ........................ 260/29.7 H; 260/29.7 T; 260/29.7 NR
[58] Field of Search ................... 260/29.7 H, 29.7 T, 260/29.7 NR; 428/511

[56] References Cited

U.S. PATENT DOCUMENTS

| 2,141,546 | 12/1938 | Strain | 260/78 R |
|---|---|---|---|
| 3,392,048 | 7/1968 | Rolick | 260/29.7 H |
| 3,941,912 | 3/1976 | Tajima et al. | 260/29.7 H |

Primary Examiner—M. J. Welsh
Attorney, Agent, or Firm—James J. Long

[57] ABSTRACT

Latex compositions with improved water resistance, chemical stability and rheological properties, useful either as the sole binder or as the co-binding agent with pigmentary material in paper coating compositions, made by aqueous emulsion polymerization of a monomeric mixture of, by weight, A. 35 to 75 parts of a monovinylidene aromatic monomer (e.g., styrene), B. correspondingly 65 to 25 parts of an aliphatic conjugated diene, said monomers (A) plus (B) constituting from 75 to 99.5% of the total monomeric mixture, C. 0.5 to 10% of an acryloyloxycarboxylic acid type monomer (e.g., beta-carboxyethylacrylate), and, optionally, D. 0 to 15% of one or more different hydrophilic monomers (e.g., mono-beta-hydroxyethylmaleate).

20 Claims, No Drawings

PAPER COATING LATEX COMPOSITIONS CONTAINING COPOLYMERS OF MONOVINYLIDENE AROMATIC MONOMER, ALIPHATIC CONJUGATED DIENE AND AN ARYLOYLOXYCARBOXYLIC ACID MONOMER

This invention relates to a copolymer, particularly in latex form, as well as to a paper coating composition containing such latex, and to paper coated therewith.

The invention is concerned essentially with what may be termed modified copolymer latex, containing a modifying termonomer which is an acryloyloxycarboxylic acid type monomer.

U.S. Pat. No. 2,141,546, Dec. 27, 1938, Strain, discloses polymerizable monomers of the type

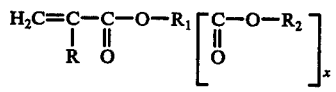

Although it is indicated by Strain that $R_2$ can be hydrogen (this would make the compound an acryloyloxycarboxylic acid, which is the type of monomer employed in this invention), nevertheless in all of the compounds Strain actually discloses $R_2$ is a hydrocarbon radical (making the compound an acryloyloxycarboxylate, that is, an ester, which is unsuitable for use in the present invention). Strain names numerous other polymerizable substances with which his compounds may be copolymerized, but no specific terpolymers are disclosed; in particular, modification of styrene-butadiene copolymer systems by an acryloyloxycarboxylic acid as in the present invention is not disclosed. Although Strain mentions coating, latex is not disclosed and neither is emulsion polymerization.

British Pat. No. 991,623, May 12, 1965, Rohm and Haas, discloses novel copolymers wherein at least 50% of one of the monomers (e.g., styrene) is copolymerized with from 0.5 to 10% of an acryloyloxycarboxylic acid. Optionally, one or more other monoethylenically unsaturated monomers may be in the copolymer. The present modified SBR-type copolymers are not disclosed, nor any latex paper coating composition.

U.S. Pat. No. 3,404,116, Oct. 4, 1968, Pueschner, discloses paper coating compositions based on latex of a copolymer of a monovinylidene aromatic monomer, an aliphatic conjugated diene, a half ester of an aliphatic diol and an alpha, beta-ethylenically unsaturated aliphatic monocarboxylic acid. Use of acryloyloxycarboxylic acid monomer is not disclosed.

Paper coating compositions generally consist of a pigment, such as clay or precipitated $CaCO_3$ and an adhesive material which very often is a synthetic latex. Latexes of interpolymers of styrene and 1,3-butadiene with or without small amounts of one or more ethylenically unsaturated carboxylic acids have been developed and employed with starch or other natural binders in a so-called "co-binder" formulation. Many problems in the paper coating industry have resulted from chemical instability of the coating formulation due to poor multivalent ion stability or excessive viscosity and poor binding properties determined by wet pick resistance. It, therefore, would be highly desirable to have a coating composition which would remain stable to polyvalent metal ions such as $Ca^{++}$ and provide good water resistance to the coated paper.

The present invention relates to an improved latex composition derived from aqueous emulsion polymerization of specified monomers resulting in a latex having outstanding water resistance and electrolyte tolerance in paper coating applications. The improved latex composition of the invention comprises an aqueous dispersion of a copolymer resulting from a monomeric charge containing, by weight:

A. 35 to 75 parts of a monovinylidene aromatic monomer;

B. correspondingly 65 to 25 parts of an aliphatic conjugated diene [per 100 parts of (A) plus (B)], said monomers (A) plus (B) constituting from 75 to 99.5% of the total monomeric mixture;

C. 0.5 to 10% of an acryloyloxycarboxylic acid monomer having the formula

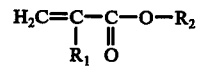

wherein $R_1$ is hydrogen or an alkyl radical having 1 to 6 carbon atoms and $R_2$ is:

i.

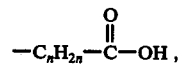

where $n$ is 1 to 6;

ii.

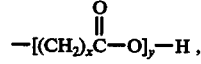

where $x$ is 1 to 4 and $y$ is 2 to 4; or iii.

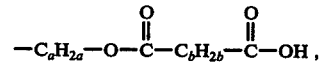

where $a$ and $b$ are the same or different and are from 1 to 4; and

D. optionally 0 to 15% of one or more different hydrophilic monomers.

The latex composition of the invention is obtained by copolymerizing a mixture of the indicated monomers (A), (B) and (C) [and, optionally, (D)] in the indicated proportions by aqueous emulsion polymerization. If desired, more than one of any of the monomers (A), (B), (C) or (D) may be employed. A stable latex composition is obtained which has unexpected advantageous properties for paper coating applications with or without natural binders such as starch. The latexes have remarkably improved tolerance for electrolytes, especially with respect to inorganic cations such as $Ca^{++}$ which may or may not be present in the formulation of a pigmented paper coating composition. The paper coated with the improved latex composition also has surprisingly enhanced water resistance.

The monovinylidene aromatic monomers (A) employed are represented by styrene, substituted styrenes (such as styrene having halogen, alkoxy, cyano or alkyl substituents) and vinyl naphthalene. Some specific examples of substituted styrenes are alpha methylstyrene, ar-methylstyrene, ar-ethylstyrene, alpha, ar-dimethylstyrene, ar,ar-dimethylstyrene, ar-t-butylstyrene, methoxystyrene, cyanostyrene, acetylstyrene, monochlorostyrene and dichlorostyrenes.

The aliphatic conjugated dienes (B) employed include butadiene, substituted butadienes and other acrylic compounds having at least two sites of ethylenic unsaturation in conjugation. Specific examples are isoprene, chloroprene, 2,3-dimethylbutadiene, 1,3-methylpentadiene and especially 1,3-butadiene.

The acryloyloxycarboxylic acid type monomers (C) of the formula stated above include substituted acryloyloxycarboxylic acid types and are represented by such compounds as i. alpha-acryloyloxyacetic acid, beta-acryloyloxypropionic acid, beta-methacryloyloxypropionic acid, beta-ethacryloyloxypropionic acid, beta-propacryloyloxypropionic acid, beta-butacryloyloxypropionic acid, beta-acryloyloxybutanoic acid, gamma-acryloyloxybutanoic acid, beta-methacryloyloxybutanoic acid, delta-acryloyloxypentanoic acid, epsilon-acryloyloxyhexanoic acid;

ii. [beta-acryloyloxy-beta-propionoxy]-propionic acid, [beta-methacryloyloxy-beta-propionoxy]-propionic acid, [beta-acryloyloxy-beta-propionoxy-beta-propionoxy]-propionic acid, [beta-acryloyloxy-beta-propionoxy beta-propionoxy-beta-propionoxy]-propionic acid, [beta-acryloyloxy-beta-pentanoxy-beta-pentanoxy-beta-pentanoxy]-pentanoic acid;

iii. beta-acryloyloxyethyl monosuccinate, beta-methacryloyloxyethyl monosuccinate, gamma-acryloyloxypropyl monosuccinate, gamma-acryloyloxypropyl monoglutarate gamma-acryloyloxyethyl monoglutarate, gamma-acryloyloxyethyl monoadipate. In many cases it is preferred to employ from 0.7 to 5% by weight of the (C) type monomer in preparing the copolymer.

The additional, different hydrophilic monomeric compounds (D) which may optionally be present in the copolymer are exemplified by acrylic acid, methacrylic acid, itaconic acid, acrylamide, N-methylolacrylamide, N-methylolmethacrylamide, beta-hydroxyethylacrylate, beta-hydroxyethylmethacrylate, gamma-hydroxypropylmethacrylate,mono- and di- beta-hydroxyethylitaconate, mono- and di- beta-hydroxyethylmaleate, vinyl ketone types, acrolein, diacetaone arylamide, glycidyl methacrylate, acrylonitrile,hydroxy-polyethyleneoxy-half and full esters of maleic acid, hydroxypolyethyleneoxy-half and full esters of itaconic acid, methylacrylate, ethylacrylate, propylacrylate, butylacrylate, and the like. Many such hydrophilic monomers may be represented by the formula

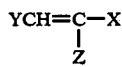

wherein:

X is carboxy, carbamoyl, N-hydroxymethylcarbamoyl, cyano, hydroxyethoxycarbonyl, hydroxyalkyleneoxycarbonyl, hydroxypropoxycarbonyl, formyl, hydroxypolyethyleneoxycarbonyl, acetyl, 2,3-epoxypropyl, methylcarboxy, ethylcarboxy, propylcarboxy, butylcarboxy;

Y is hydrogen or X (Y and X being the same or different); and

Z is hydrogen, $C_1$-$C_3$ alkyl, carboxy or carboxymethylene.

The improved compositions may be prepared by a batchwise, semi-continuous or continuous emulsion polymerization process. The emulsion polymerization process is carried out in aqueous media incorporating therein a free radical producing catalyst, normally in an amount of from 0.01 to 3.0 percent based on the total weight of the monomers, at a pH level of from 1.5 to 7.0, and preferably with a chain transfer agent and an emulsifier. Among the free radical producing catalysts are peroxygen compounds including the inorganic persulfate compounds such as potassium persulfate, ammonium persulfate; the peroxides such as hydrogen peroxide; the organic hydroperoxides and organic peroxides. These catalysts may sometimes be activated by a water soluble reducing agent.

Usually at least one anionic emulsifier and/or one or more of the known non-ionic emulsifiers may also be present in the polymerization charge. Representative classes of anionic emulsifiers are alkali metal alkyl aryl sulfonates, alkali metal alkyl sulfates, the sulfonated alkyl esters and the like. Specific examples of these well known emulsifiers are sodium dodecylbenzene sulfonate, sodium laurylsulfate, disodium dodecyl diphenyl ether disulfonate, N-octadecyldisodium sulfosuccinate, dioctyl sodium sulfosuccinate and dicyclohexyl sodium sulfosuccinate.

Optionally, other ingredients well known in the emulsion polymerization art may be included such as chelating agents, buffering agents, accelerators, redox agents, inorganic salts, thickeners, chain-transfer agents and pH adjusting agents.

In the preparation of the present latexes, the polymerization temperature is ordinarily above 40° C. and preferably should fall in the range of from 50° to 98° C.

The pH of the aqueous medium is maintained during polymerization at a value from about 1.5 to 7.0 but preferably from about 3 to about 5.

The improved latex compositions produced by emulsion polymerization as descibed can have a wide range of solids content although usually the solids content is above 40% by weight, more typically from about 45% to about 65%. Such latexes exhibit improved Ca++ stability. The Ca++ stability as reported herein is the percentage of coagulum generated by the addition of 2 cc. of 6% $CaCl_2$ solution to 20 grams of latex of 45% total solids content unless otherwise specified.

The latex compositions produced in accordance with this invention are especially desirable as coating compositions for paper and paper board, as the sole binder or along with other binders in combination with the usual pigments. Pigments which are oridinarily used are essentially finely divided materials which are primarily mineral in character but may sometimes be organic in part. The pigment system primarily consists of highly refined clays, especially of the kaolin type. Minor proportions of calcium carbonate, titanium dioxide, talc, blanc fixe and similar pigmentary materials may also be used to provide certain desirable properties in the coated paper such as increased brightness and opacity.

The pigment or pigment mixture is preferably first dispersed in water using a dispersing agent such as sodium hexametaphosphate, and the pH is adjusted to the desired range before mixing with said latex to form the aqueous coating composition.

The coating mixture, when ready for use, contains pigments, adhesives, additives and water and is referred to as a "coating color". The ratio of adhesive to pigment used in a paper coating color is usually from about 1 to about 30 parts of dry adhesive for each 100 parts of dry pigment. The latex composition of the invention may if desired be the sole binding adhesive employed in the coating color. Other adhesives, known in the art, such as starch, casein, soybean proteins or other synthetic latexes may be used in combination with the latex composition of the present invention in a so-called mixed or co-binder adhesive system.

The total solids content of the coating color can vary over the range of from 8% to about 65%, usually from 40 to about 65% by weight depending largely on the coating equipment used.

The viscosity of the coating color is usually measured prior to the coating of paper using a Hercules high-shear viscometer.

The coating color is applied to paper or paper board by conventional means such as offset roll coater, size press, letter press print coater, air knife or blade coater.

The dry pick and wet pick resistances may be evaluated with the standard IGT printability tester as developed by the Institute of Graphic and Allied Industries of Amsterdam, Holland. Briefly, the IGT wet pick test consists of transferring a uniform, thin water film 0.3 micron thick to an offset roller which is then brought into contact with the paper to be tested. The wetted paper is then printed at a constant speed against another offset roller inked with standard offset ink. This operation simulates two color offset lithography. The resultant test papers are compared with standards and given comparable ratings from 1-excellent, to 10-extremely poor. The IGT dry pick test involves printing at accelerating speed of a standard ink on the paper to be tested. The resistance of a given coating to ink splitting during high printing speeds is called dry pick resistance. It is measured by observing the printing speed at which picking first occurs. The higher the speed at which pick occurs, the better its dry pick resistance.

It will be understood that the term "paper" as used herein includes various paper products whether based on thin paper or paper board, or the like.

The following examples illustrate the invention. All parts and proportions referred to herein are by weight unless otherwise indicated.

EXAMPLE 1

This example demonstrates the preparation of an improved latex composition of the invention using the following basic recipe:

100 parts water
3 parts dodecylbenzenesodium sulfonate
1 part potassium persulfate
0.7 part sodium bicarbonate
0.5 part carbon tetrachloride
2.7 parts beta-acryloyloxypropionic acid
59 parts styrene
38.3 parts 1,3-butadiene
0.2 part ethylenediamine tetraacetic acid salt.

The above ingredients are charged to a polymerization reaction vessel. The vessel is then heated to 60° C. and polymerization is allowed to continue at that temperature for 17 hours with agitation yielding a very stable latex having a pH 3.5 and containing 50% total solids. See latex sample 1 in Table I below. Another latex composition (referred to as latex sample 2 in Table I below) typifying the prior art (U.S. Pat. No. 3,177,173, Apr. 6, 1965, Filter et al.), is similarly prepared using essentially the same recipe with the exception that the 2.7 parts of beta-acryloyloxypropionic acid is replaced with a mixture of 1.1 parts of itaconic acid and 1.6 parts of acrylic acid.

TABLE I

|  | Latex Sample 1 | Latex Sample 2 |
| --- | --- | --- |
| Beta-acryloyloxypropionic acid | 2.7 | — |
| Itaconic Acid | — | 1.1 |
| Acrylic Acid | — | 1.6 |
| $Ca^{++}$ Stability (%) [a] | 25.6 | 36.7 |
| Hercules Viscosity (poise) [b] | .45 | .57 |
| IGT Wet Pick Resistance | 2.8 | 5.2 |

[a] % coagulum from addition of 2 cc. 6% $CaCl_2$ solution to 20 grams 45% T.S. latex at pH 9.5.
[b] Coating color at 61% T.S., shear rate = 4,140 $sec^{-1}$.

As judged by the $Ca^{++}$ stability tests, latex sample 1 (of the present invention) exhibits better $Ca^{++}$ stability than latex sample 2. The coating colors are prepared from each of the two latexes using 13 parts latex (dry) for every 100 parts of number 2 coating clay and separately applied to paper, dried and tested for wet pick resistance. IGT wet pick resistance results show latex sample 1 to be considerably better than latex sample 2 of the prior art and that an enhancement of both chemical stability and wet pick resistance can be obtained by the use of beta-acryloyloxypropionic acid in place of conventional monoethylenically unsaturated carboxylic acids such as acrylic acid and itaconic acid.

Latexes prepared according to sample 1, but using (beta-acryloyloxy-beta-propionoxy)propionic acid or (beta-methacryloyloxy-beta-propionoxy)propionic acid, in place of beta-acryloyloxypropionic acid, exhibit similar results.

EXAMPLE 2

This example illustrates the effect of adding a hydrophilic monomeric compound (D), i.e., mono-beta-hydroxyethylmaleate (reaction product of one mole of maleic anhydride with one mole of ethylene glycol) to the latex composition (latex sample 1) shown in Example 1; comparison is made with two prior art samples (latex sample 3 vs. latex samples 4 and 5 in Table II).

TABLE II

|  | Latex Sample 3 | Latex Sample 4 [c] | Latex Sample 5 [d] |
| --- | --- | --- | --- |
| Beta-acryloyloxypropionic acid | 2.7 | — | — |
| Itaconic Acid | — | 1.1 | — |
| Acrylic Acid | — | 1.6 | — |
| Mono-beta-hydroxyethylmaleate | 2.0 | 2.0 | — |
| $Ca^{++}$ Stability (%) [a] | 6.7 | 16.7 | 24.5 |
| Hercules Viscosity (poise) [b] | 0.7 | 0.9 | >1.0 |
| IGT Wet Pick Resistance | 1.5 | 3.8 | 3.2 |

[a] % coagulum from addition of 2 cc. 6% $CaCl_2$ solution to 20 g. latex at 45% total solids at pH 9.5.
[b] Coating color at 61% Total Solids; shear rate - 4,140 $sec^{-1}$.
[c] Prepared in accordance with Japanese patent 721,235, Sumitomo-Naugatuck Co., October 26, 1973.
[d] A commercially available material beleived to be based on a copolymer of styrene, butadiene and a conventional carboxylic acid monomer (Gen Flo 5057, trademark).

The $Ca^{++}$ stability results in Table II indicate that latex sample 3 which contains the beta-acryloyloxypropionic acid (as practiced in this invention) has significantly better $Ca^{++}$ stability than the two prior art latexes. Paper coating colors are prepared in the same manner as disclosed in Example 1. The coating colors from each of the three latexes are separately applied to paper, dried and tested for IGT wet pick resistance. Results, as shown in Table II, demonstrate that paper coated with the present coating color compostion is superior to those disclosed in the prior art.

EXAMPLE 3

This example demonstrates the effect of an acryloyloxyacid in attaining good chemical stability in the present latex composition, compared with an ester of an acryloyloxyacid which is unsatisfactory in this respect.

|  | Latex Sample 6 Parts by Weight | Latex Sample 7 parts by Weight |
|---|---|---|
| Water | 100 | 100 |
| Dodecylbenzenesodium Sulfonate | 3 | 3 |
| Potassium Persulfate | 1 | 1 |
| Sodium Bicarbonate | 0.75 | 0.75 |
| Carbon Tetrachloride | 0.5 | 0.5 |
| Beta-acryloyloxypropionic acid | 4.0 | — |
| Methyl ester of beta-acryloyloxypropionic acid | — | 4.0 |
| Styrene | 56 | 56 |
| Butadiene | 40 | 40 |
| Ethylenediamine tetraacetic acid salt | 0.2 | 0.2 |

Each of the above latexes are emulsion polymerized at 55° C. for 20 hours using the above recipe. While latex sample 6 (of the present invention) is completely stable in the reactor, 1.6 grams per 100 grams of polymer solids in the form of reactor coagulum is found in latex sample 7. The Ca++ stability test results shown in Table III indicate that latex sample 6 has much better stability than latex sample 7.

TABLE III

|  | Latex Sample 6 | Latex Sample 7 |
|---|---|---|
| Reactor coagulum, PHR | 0 | 1.6 |
| Ca++ Stability (%) (a) | 9.6 | 82.5 |
| IGT Wet Pick Resistance |  |  |
| Sole Binder | 2 | 5.5 |
| Starch/Latex Binder | 2.5 | 3.7 |

(a) % coagulum from addition of 2 cc. 6% CaCl$_2$ solution to 20 grams of a 40% solids content latex.

The latexes are then compared in paper coating applications by preparing two different coating colors, (1) in a sole latex binder formulation and (2) in a starch/latex co-binder formulation as shown below:

|  | Sole Binder Formulation Parts by Weight | Co-Binder Formulation Parts by Weight |
|---|---|---|
| Latex | 13 | 11 |
| Starch, medium viscosity | — | 6 |
| #2 Coating Clay | 100 | 100 |
| Sodium Hexamethaphosphate | 0.3 | 0.3 |
| Alkali Sensitive Thickener* | 0.2 | — |
| pH adjusted with NH$_3$ to - | 8.8 | 8.8 |
| Water to adjust % T.S.** to - | 60 | 60 |

*Polyacrylic acid emulsion
**Weight percent total solids

The coating colors are separately applied to paper, dried and tested for IGT wet pick resistance. The wet pick resistance results shown in Table III demonstrate that in both the sole latex binder and the starch/latex co-binder formulations, latex sample 6 is superior to latex sample 7.

EXAMPLE 4

This example demonstrates the effectiveness of several other acryloyloxy acids when used in combination with a hydrophilic monomeric compound in SBR latex coating compositions of the invention.

|  | Latex Sample 8 Parts by Weight | Latex Sample 9 Parts by Weight |
|---|---|---|
| Beta-acryloyloxyethyl-monosuccinate | 2.7 | — |
| Beta-methacryloyloxy-ethylmonosuccinate | — | 2.7 |
| Potassium persulfate | 1.0 | 1.0 |
| Sodium bicarbonate | .7 | .7 |
| Dodecylbenzene sodium sulfonate | 3.0 | 3.0 |
| Ethylenediamine tetraacetic acid salt | .2 | .2 |
| Carbon tetrachloride | .5 | .5 |
| Water | 100 | 100 |
| Styrene | 59 | 59 |
| Butadiene | 36.3 | 36.3 |
| Mono-beta-hydroxyethyl-maleate | 2.0 | 2.0 |

The emulsion polymerization procedure is the same as described in Example 1. Very stable latexes containing about 50% total solids are obtained. As is shown in Table IV, the Ca++ stability of each of the latexes is better than that of a commercially available SBR latex composition (see latex sample 5 in Example 2). A sole latex binder paper coating color is prepared from each of the two latexes according to the sole binder formulation illustrated in Example 3. The coating colors are coated onto paper, dried and tested for IGT wet pick resistance. The results show that each coating color exhibits excellent wet pick resistance and in each case is superior to that of prior art coating colors as exemplified by latex sample 4 and sample 5 in Example 2.

TABLE IV

|  | Latex Sample 8 | Latex Sample 9 |
|---|---|---|
| Ca++ Stability (%) (a) | 10.5 | 8.9 |
| IGT Wet Pick Resistance | 1.6 | 1.4 |

(a) % coagulum on addition of 2 cc of 6% CaCl$_2$ solution to 20 grams of 45% total solids latex.

EXAMPLE 5

This example demonstrates the effect of varying levels of beta-carboxyethylacrylate added to an SBR latex coating composition of this invention and in comparison to an SBR composition containing no additive. Essentially the same recipe is employed in the emulsion polymerization procedure as in Example 1 with the exception of slightly different monomer ratios, as indicated in Table V. The pH of the latex samples is 3.5.

TABLE V

|  | Latex Sample 10 | Latex Sample 11 | Latex Sample 12 | Latex Sample 13 |
|---|---|---|---|---|
|  | Parts by Weight | | | |
| Styrene | 58 | 57 | 56 | 58 |
| Butadiene | 40 | 40 | 40 | 42 |
| Beta-acryloyloxypropionic acid | 2 | 3 | 4 | — |
| TEST RESULTS |  |  |  |  |
| Ca++ Stability (%) (b) | 20.0 | 2.2 | 0 | 63 |
| IGT Wet Pick |  |  |  |  |

TABLE V-continued

|  | Latex Sample 10 | Latex Sample 11 | Latex Sample 12 | Latex Sample 13 |
|---|---|---|---|---|
|  | Parts by Weight | | | |
| Resistance [a] | 3.8 | 2.6 | 1.6 | 10.0 |

[a] The sole binder coated color formulation was the same as described in Example 3.
[b] pH adjusted to 8.0

The results, as shown in Table V, indicate that by adding varying amounts of beta-acryloyloxypropionic acid to the SBR latex composition the wet pick resistance is significantly improved (compare latex samples 10, 11 and 12 with latex sample 13).

EXAMPLE 6

This example demonstrates the effect of styrenebutadiene levels as shown in Table VI on chemical stability and the dry and wet pick resistance properties of the coated paper in the present latex compositions containing beta-acryloyloxypropionic acid.

TABLE VI

|  | Sample 14 | Sample 15 | Sample 16 | Sample 17 |
|---|---|---|---|---|
|  | Parts by Weight | | | |
| Styrene | 16 | 36 | 56 | 81 |
| Butadiene | 80 | 60 | 40 | 15 |
| Beta-acryloyloxy-propionic acid | 4 | 4 | 4 | 4 |
| TEST RESULTS | | | | |
| Ca++ Stability (%) [a] | 2.6 | 2.7 | 8.5 | 9.6 |
| IGT Dry Pick Resistance [b] | 165 | 175 | 180 | 100 |
| IGT Wet Pick Resistance [b] | 3.5 | 3.0 | 2 | 6 |

[b] The sole binder coating formulation was the same as described in Example 3.
[a] % coagulum on addition of 2cc of 6% CaCl₂ solution to 20 grams of 40% total solids latex.

The data in Table VI show that a latex containing an excessively high amount of styrene (see sample 17) exhibits poor IGT dry and wet pick resistance thus rendering it unsuitable for most common paper coating applications. At medium and low levels of styrene in the copolymer (see samples 14, 15 and 16) the IGT dry and wet pick resistance is more than adequate for paper coating purposes.

An important advantage of the invention resides in the fact that the present latexes based on acryloyloxy-type acid monomer of the formula indicated above provide water resistant compositions at a lower content of COOH equivalents than conventional acid-type latexes.

What is claimed is:
1. A latex of a copolymer of a monomeric mixture containing, by weight:
 A. 35 to 75 parts of a monovinylidene aromatic monomer;
 B. correspondingly 65 to 25 parts of an aliphatic conjugated diene, per 100 parts of (A) plus (B), said monomers (A) plus (B) constituting from 75 to 99.5% of the total monomeric mixture;
 C. 0.5 to 10% of a monomer having the formula

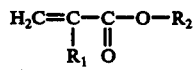

wherein R₁ is hydrogen or an alkyl radical having 1 to 6 carbon atoms and R₂ is:
 i.

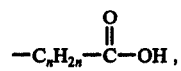

where n is 1 to 6;
 ii.

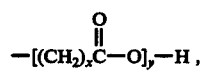

where x is 1 to 4 and y is 2 to 4; or
 iii.

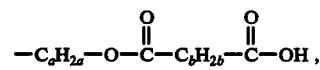

where a and b are the same or different and are from 1 to 4; and
 D. optionally 0 to 15% of one or more different hydrophilic monomers, said latex being characterized by improved stability.
2. A latex as in claim 1 in which R₂ is (i).
3. A latex as in claim 1 in which R₂ is (ii).
4. A latex as in claim 1 in which R₂ is (iii).
5. A latex as in claim 1 in which (C) is beta-acryloyloxypropionic acid.
6. A latex as in claim 1 in which (C) is beta-acryloyloxyethyl monosuccinate.
7. A latex as in claim 1 in which (C) is beta-methacryloyloxyethyl monosuccinate.
8. A latex as in claim 1 in which (A) is styrene.
9. A latex as in claim 1 in which (B) in butadiene.
10. A latex as in claim 1 in which (D) is present as mono-beta-hydroxyethylmaleate.
11. A latex as in claim 1 in which (A) is styrene, (B) is butadiene, and (C) is beta-acryloyloxypropionic acid.
12. A latex as in claim 1 in which (A) is styrene, (B) is butadiene, (C) is beta-acryloyloxypropionic acid, and (D) is mono-beta-hydroxyethyl maleate.
13. A latex as in claim 1 in which (A) is styrene, (B) is butadiene and (C) is beta-acryloyloxyethylmonosuccinate.
14. A latex as in claim 1 in which (A) is styrene, (B) is butadiene and (C) is beta-methacryloyloxymonosuccinate.
15. A paper coating composition comprising a latex as in claim 1 as a binder, and a pigment.
16. A paper coating composition as in claim 15 in which the amount of copolymer is from about 1 to about 30 parts by weight per 100 parts by weight of the pigment.
17. A paper coating composition as in claim 15 in which additional natural and/or synthetic binder is present.
18. A coated paper product, coated with a dried deposit of a paper coating composition as in claim 15.
19. A coated paper product, coated with a dried deposit of a paper coating composition as in claim 16.
20. A coated paper product, coated with a dried deposit of a paper coating composition as in claim 17.

* * * * *